United States Patent
Wu et al.

(10) Patent No.: US 6,298,023 B1
(45) Date of Patent: Oct. 2, 2001

(54) METHOD AND APPARATUS FOR CONTROLLING THE WRITING OF INFORMATION ONTO A STORAGE MEDIUM

(76) Inventors: Shengquan Wu, 363 Morse Ave., Sunnyvale, CA (US) 94086; Phares Grey, 952 Coventry Way, Milpitas, CA (US) 95035

( * ) Notice: Subject to any disclaimer, the term of this patent is extended or adjusted under 35 U.S.C. 154(b) by 0 days.

(21) Appl. No.: 09/321,491

(22) Filed: May 27, 1999

(51) Int. Cl.$^7$ ........................................................ G11B 3/90
(52) U.S. Cl. .................. 369/53.2; 369/53.34; 369/47.28; 369/59.11
(58) Field of Search ............................ 369/32, 33, 47.14, 369/47.15, 47.17, 47.25, 47.27, 47.28, 47.36, 47.49, 47.5, 47.51, 47.54, 53.2, 53.25, 53.29, 53.31, 53.36, 59.11, 124.14

(56) References Cited

U.S. PATENT DOCUMENTS

| 5,031,168 | * | 7/1991 | Moore ................................ 369/59.25 |
| 5,623,472 | * | 4/1997 | Bakx et al. .................... 369/47.51 X |
| 5,777,813 | * | 7/1998 | Sun et al. ...................... 369/44.13 X |
| 5,854,779 | * | 12/1998 | Johnson et al. .................... 369/59.18 |

\* cited by examiner

*Primary Examiner*—Paul W. Huber
(74) *Attorney, Agent, or Firm*—Bobbie Truong

(57) ABSTRACT

Under current CD-R and CD-RW technology, whenever a present mark is burned onto a CD, only the dimension of the present mark is considered in controlling the heat source (e.g. a laser). The present invention improves upon the current technology by taking into account not only the dimension of the present mark but also the effects on the present mark due to the marks and spaces within relatively close proximity to the present mark. By doing so, the present invention significantly improves the accuracy of the writing process. This in turn enables the present invention to eliminate the writing errors of the prior art.

15 Claims, 7 Drawing Sheets

| BIT VALUES | DIMENSION |
|---|---|
| 0 0 0 | 3 T |
| 0 0 1 | 4 T |
| 0 1 0 | 5 T |
| 0 1 1 | 6 T |
| 1 0 0 | 7 T |
| 1 0 1 | 8 T or 9 T |
| 1 1 0 | 1 0 T |
| 1 1 1 | 1 1 T |

METHOD AND APPARATUS FOR CONTROLLING THE WRITING OF INFORMATION ONTO A STORAGE MEDIUM

FIELD OF THE INVENTION

This invention relates generally to storage systems and more particularly to a method and apparatus for controlling the writing of information onto a storage medium.

BACKGROUND OF THE INVENTION

For a number of years now, optical media such as CD-ROM's (compact diskread only memory) and CD-DA's (compact disk-digital audio) have been used as mass storage devices for storing large amounts of information. Traditionally, information is stored onto a CD in the form of a series of pits and lands. A pit is a physical indention in the medium, whereas a land is a flat area in which there is no indention. Pits and lands are typically imposed onto a CD using a mechanical stamping mechanism. Because they are at different elevations, pits and lands reflect light differently. This difference in reflection is exploited at read time to extract information from the CD. More specifically, to read information from a CD, a light source, such as a laser, is directed at the surface of the CD. As this light source scans the various pits and lands, the light is reflected, and the reflections are capture by a detection mechanism. Because pits and lands reflect light differently, the reflection from a pit will differ from the reflection from a land. This difference is detected by the detection mechanism. By detecting the differences in reflections, the detection mechanism is able to discern the pits from the lands, which in turn makes it possible to extract the stored information (e.g. the 1's and 0's) from the CD.

While traditional CD technology has been effective for storing large amounts of information onto relatively small CD's, it does have several shortcomings. The first is that a typical consumer cannot store information onto a CD. Because the pits and lands must be made by a sophisticated stamping mechanism, and because this mechanism is usually quite expensive, most consumers cannot afford the equipment necessary for storing information onto a CD. A second shortcoming is that information can be recorded onto a traditional CD only once. Once the pits and lands have been mechanically stamped onto the CD, they cannot be removed. Because of these two limitations, CD's have primarily been used in the past only by the entertainment and software industries as a medium for distributing their merchandise. CD's have traditionally not been used by consumers as a recording medium.

In recent years, however, new technologies have emerged that make CD's much more usable as recording media. These technologies include CD-R (compact disk-recordable) and CD-RW (compact-disk rewritable). With CD-R and CD-RW, information is imposed onto a CD not by stamping pits and lands but by burning in marks and spaces. A mark is an area which has been burned by a heat source, such as a laser, whereas a space is an area which has not been burned or just slightly burned. CD-R and CD-RW operate under the same general optical principles as traditional CD's. Basically, a mark reflects light differently than a space. This difference in reflection is detectable by a detection mechanism to discern the marks from the spaces. Thus, as with traditional CD's, information can be extracted by applying a light source, and by detecting the differences in reflections. That is where the similarity stops, however.

Because information is imposed by burning marks and spaces as opposed to stamping pits and lands, all of the shortcomings associated with stamping are eliminated. Namely, no expensive stamping equipment is needed to record information. Instead, a relatively inexpensive burning mechanism (such as a laser) can be used. Also, because the marks and spaces, unlike pits and lands, are not physical marks, they can be erased (from certain special materials). As a result, a CD can now be rewritable. These and other aspects of CD-R and CD-RW enable CD's to be used by consumers as general recording media.

CD-R and CD-RW do not come without their shortcomings, however. One major shortcoming is that the current technology has problems controlling the precise dimensions of the marks and spaces that are imposed onto a CD. At times, a mark or a space is longer than it should be, and at other times, it is shorter than it needs to be. Because the dimensions of the marks and spaces determine the information stored on the CD, errors in these dimensions can lead to incorrect information being stored. Such errors can give rise to serious consequences. As a result, an improved writing control mechanism is needed to ensure accuracy of the writing process.

SUMMARY OF THE INVENTION

Under the current technology, whenever a present mark is burned onto a CD, only the dimension of the present mark is considered in controlling the heat source (e.g. a laser). The present invention is based, at least partially, upon the observation that because heat is being used to make the mark, and because the effects of heat spread, considering just the dimension of the present mark is not sufficient. Rather, the thermal effects due to the marks and spaces within relatively close proximity to the present mark (as well as other effects) should also be taken into account to maximize accuracy.

Based upon this observation, the present invention provides an improved method and apparatus for controlling the writing of information onto a storage medium. Particularly, whenever a present mark is written onto a storage medium, the control mechanism of the present invention takes into account not just the dimension of the present mark, but also the effects on the present mark due to the marks and spaces within relatively close proximity to the present mark. These marks and spaces may include the marks and spaces preceding the present mark, as well as the marks and spaces following the present mark. By taking the effects of the surrounding marks and spaces into account, the present invention significantly improves the accuracy of the writing process. This in turn enables the present invention to eliminate the writing errors of the prior art.

DETAILED DESCRIPTION OF THE EMBODIMENT(S)

Figures 1, 2:
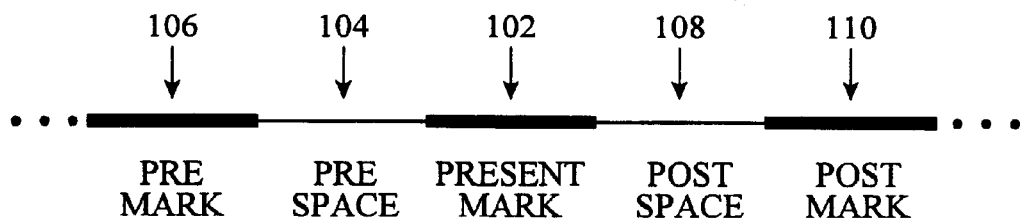
FIG. 1 is a pictorial representation of several marks and spaces on a storage medium.
FIG. 2 is a table showing possible bit values and their corresponding dimensions.

With reference to FIG. 1, there is shown a pictorial representation of several marks and spaces on a storage medium (such as a recordable CD or a rewritable CD), including a present mark 102, a pre space 104 and a pre mark 106 preceding the present mark 102, and a post space 108 and a post mark 110 following the present mark 102. As shown in FIG. 1, each mark 102, 106, 110 is separated from the next mark by a space 104, 108. As used herein, the terms "mark" and "space" refer broadly to areas of the storage medium having different reflective properties. Typically, a mark is an area which has been burned by a relatively high power heat source, while a space is an area which has not been burned or just slightly burned by a relatively low power heat source. At read time, the difference in reflective properties is exploited to discern the marks from the spaces, thereby extracting information from the CD.

As noted above, a present mark 102 is imposed or burned onto a portion of the storage medium by subjecting the portion to a heat source, such as a laser. Because heat is used to impose all marks 102, 106, 110, and because thermal effects spread, it is desirable when imposing a present mark 102 to take into account the thermal effects from other marks 106, 110. The thermal effects due to other marks 106, 110 may vary depending upon many different factors, one of which is the dimensions of the marks 106, 110 and the spaces 104, 108. For example, if the pre mark 106 is a long mark (therefore, requiring a relatively large amount of heat to impose) and the pre space 104 is a short space (thereby causing the pre mark 106 to be closer to the present mark 102), then the effect on the present mark 102 due to the pre mark 106 will be greater than if the pre mark 106 were a short mark and the pre space 104 were a long space. Likewise, if the post mark 110 is a long mark and the post space 108 is a short space, then the effect on the present mark 102 due to the post mark 110 will be greater than if the post mark 110 were a short mark and the post space 108 were a long space. The present invention takes the dimensions of the surrounding marks and spaces into account in determining how to impose the present mark 102. In the following description of the invention, for the sake of simplicity and clarity, only the effects of one pre mark 106, one pre space 104, one post mark 110, and one post space 108 are taken into account in determining the manner in which the present mark 102 is imposed. However, it should be noted that if so desired, the effects of more spaces and marks may be taken into account. Such a modification is within the contemplation of the present invention.

The Thermal effect due to surrounding marks and spaces is just one of the factors that can be taken into account in writing the present mark 102. Many other factors, such as the specific properties of the storage medium, the temperature of the environment in which the writing process is performed, the specific equipment used to carry out the writing process, etc., may also be considered. The present invention allows any number and any type of factor to be taken into account in writing the present mark 102. This is one of the major advantages of the invention.

Each of the different marks 102, 106, 110 and spaces 104, 108 may have different dimensions. The dimensions of the marks and spaces may be measured in terms of time. One convention uses the period (T) of a bit clock (not shown) to specify the dimensions of the marks and spaces. Under this convention, a mark or a space may have dimensions ranging from a minimum of 3T (3 periods) to a maximum of 11T (11 periods). Within this range, there are nine possible discrete values (3T, 4T, 5T, 6T, 7T, 8T, 9T, 10T, and 11T). To simplify matters, the nine possible values may be reduced to eight by treating the values 8T and 9T as being the same. By reducing the possible values to eight, the dimensions of a mark or a space may be expressed using only three bits. Thus, for example, 000 may be used to indicate that a mark or a space has a dimension of 3T, 001 may be used to indicate a dimension of 4T, and so on, as shown in the table of FIG. 2. With this convention, the dimension of a mark or a space can be easily specified. This convention will be used in the following discussion.

Figure 3:
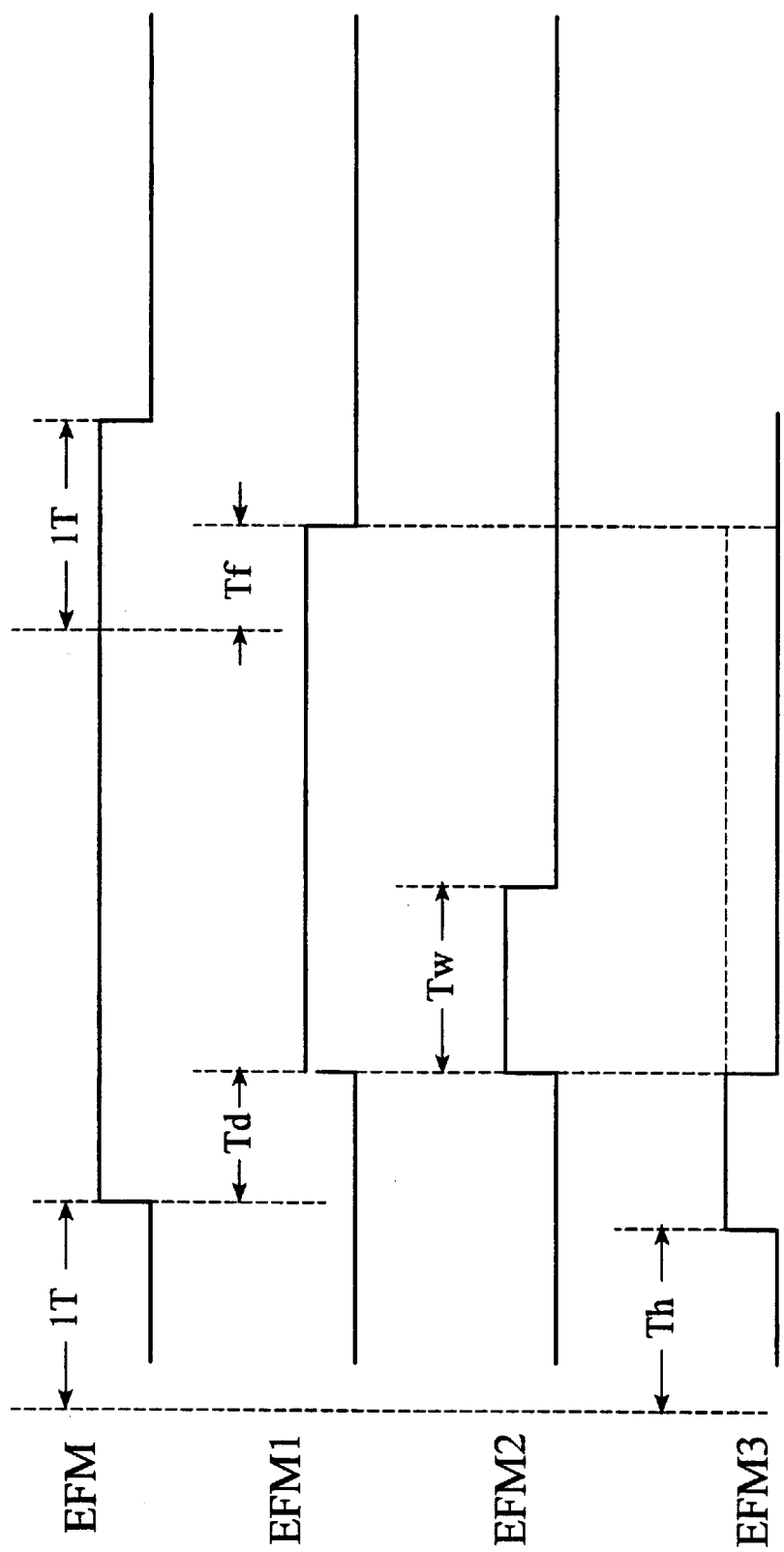
FIG. 3 shows the timing diagrams for a plurality of control signals which may be used to control a writing mechanism in accordance with the present invention. The timing diagrams of FIG. 3 apply to CD-R technology.

With reference to FIG. 3, one possible embodiment of the present invention will now be described. FIG. 3 shows the timing diagrams for a plurality of control signals which may be used to control a writing mechanism in a CD-R type of system to impose a present mark 102 onto a CD. These control signals, which are generated by the apparatus of the present invention (described in a later section), include a main control signal EFM1, a boost control signal EFM2, and a pre heat control signal EFM3. FIG. 3 further shows a reference signal EFM which represents the series of marks and spaces that are to be written onto a storage medium. The reference signal EFM includes an indication of the desired dimension of the present mark 102 (i.e. the width of the EFM pulse shown is the desired dimension of the present mark in periods T), as well as indications of the dimensions of the surrounding marks and spaces. Since the present mark 102 may range from 3T to 11T, the width of the EFM pulse may range from 3T to 11T. Once the dimensions of the present mark 102 and the surrounding marks and spaces are known, certain delays and pulse widths are determined.

Specifically, there is a delay which determines the timing of the rising edge of the preheat control signal EFM3. This delay starts from 1T prior to the rising edge of the reference signal EFM and continues to some time before or after the rising edge of the reference signal EFM. In one embodiment, this delay depends upon the dimension of the present mark 102 (i.e. the pulse width of the reference signal EFM). Since the present mark 102 may have one of eight possible dimensions (treating 8T and 9T as being the same), the delay Th may have one of eight possible values. The different values for the delay Th depend upon various factors, many of which are implementation specific. Thus, the possible values for the delay Th are determined experimentally for each implementation.

Like delay Th, the width Tw of the boost control signal EFM2, in one embodiment, is also dependent upon the dimension of the present mark 102. Since the present mark 102 may have one of eight possible dimensions, the pulse width Tw may also have one of eight possible values. The different values for the pulse width Tw depend upon various factors, many of which are implementation specific. Because of this, the possible values for the pulse width Tw are determined experimentally for each implementation.

There is also a rising edge delay Td which determines the timing of the rising edge of the main control signal EMFI.

Unlike Th and Tw, however, the value of this delay Td depends not only upon the dimension of the present mark 102 but also upon the effects due to the marks 106, 110 and spaces 104, 108 within relatively close proximity to the present mark 102. According to one embodiment, the delay Td is determined based upon the following expression:

$$Td=Tdi+Tdpre\ (Prem, Pres)+Tdpost\ (Mark, Postm, Posts);$$

where

Tdi=an intrinsic (minimum) delay value which depends upon the dimension of the present mark 102;

Tdpre=the contribution to the delay value due to the pre mark 106 and the pre space 104;

Tdpost=the contribution to the delay value due to the present mark 102, the post mark 110, and the post space 108;

Prem=the dimension of the pre mark 106;

Pres=the dimension of the pre space 104;

Mark=the dimension of the present mark 102;

Postm=the dimension of the post mark 110; and

Posts=the dimension of the post space 108.

This expression specifies that the rising edge delay Td comprises three components: (1) an intrinsic component Tdi which depends upon the dimension of the present mark 102; (2) a variable component Tdpre which depends upon the dimensions of the pre mark 106 and the pre space 104; and (3) a variable component Tdpost which depends upon the dimensions of the present mark 102, the post mark 110, and the post space 108. Tdpre may be viewed as the contribution to the delay Td from the pre mark 106 and pre space 104, while Tdpost may be viewed as the contribution to the delay Td from the post mark 110, the post space, and the present mark 102 itself. Since each mark and space has eight possible dimension values (000 to 111), and since Tdpre depends upon the combination of Pres and Prem, there are sixty four (8×8) possible values for Tdpre. Likewise, since Tdpost depends upon the 30 combination of Mark, Postm, and Posts, there are five hundred and twelve (8×8×8) possible values for Tdpost. Various factors, many of which are implementation specific, affect the values for Tdi, Tdpre and Tdpost. Thus, the values for Tdi, Tdpre and Tdpost are determined experimentally for each implementation.

There is also a falling edge delay Tf which determines the falling edge of the main control signal EFM1. Like delay Td, this delay Tf depends not only upon the dimension of the present mark 102 but also upon the effects due to the marks 106, 110 and spaces 104, 108 within relatively close proximity to the present mark 102. Delay Tf begins at 1T prior to the falling edge of the reference signal EFM, and continues until some time prior to the falling edge of the reference signal EFM. According to one embodiment, the delay Tf is determined based upon the following expression:

$$Tf=Tfi+Tfpost\ (Postm, Posts)+Tfpre\ (Mark, Prem, Pres);$$

where

Tfi=an intrinsic (minimum) delay value which depends upon the dimension of the present mark 102;

Tfpost=the contribution to the delay value due to the post mark 110, and the post space 108; and Tfpre=the contribution to the delay value due to the present mark 102, the pre mark 106 and the pre space 104.

This expression specifies that the falling edge delay Tf comprises three components: (1) an intrinsic component Tfi which depends upon the dimension of the present mark 102; (2) a variable component Tfpost which depends upon the dimensions of the post mark 10 and the post space 108; and (3) a variable component Tfpre which depends upon the dimensions of the present mark 102, the pre mark 106, and the pre space 104. Tfpost may be viewed as the contribution to the delay Tf from the post mark 110 and post space 108, while Tfpre may be viewed as the contribution to the delay Tf from the pre mark 106, the pre space 104, and the present mark 102 itself. Since each mark and space has eight possible dimension values (000 to 111), and since Tfpost depends upon the combination of Posts and Postm, there are sixty four (8×8) possible values for Tfpost. Likewise, since Tfpre depends upon the combination of Mark, Prem, and Pres, there are five hundred and twelve (8×8×8) possible values for Tfpre. Various factors, many of which are implementation specific, affect the values for Tfi, Tfpost, and Tfpre. Thus, the values for Tfi, Tfpost, and Tfpre are determined experimentally for each implementation.

Figure 4:
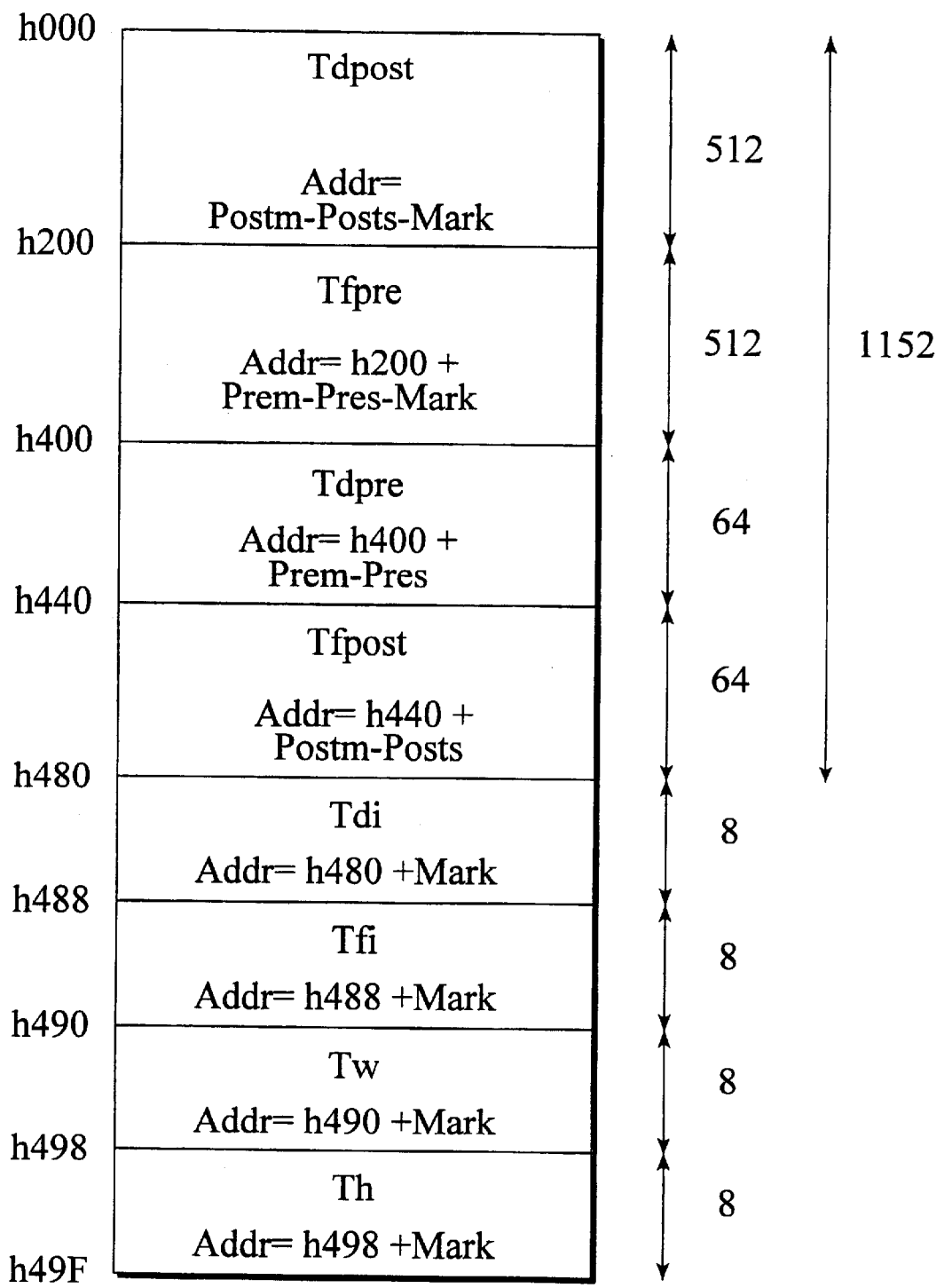
FIG. 4 shows a sample lookup table which may be used to store all of the values needed to determine the timing parameters of the control signals of FIG. 3.

To facilitate implementation of the invention, all of the values that are needed to compute the various delays and pulse widths for the control signals EFM1, EFM2, and EFM3 may be stored in a lookup table, such as that shown in FIG. 4. In the sample lookup table of FIG. 4: (1) the first 512 entries store the possible values for Tdpost; (2) the next 512 entries store the possible values for Tfpre; (3) the next 64 entries store the possible values for Tdpre; (4) the next 64 entries store the possible to values for Tfpost; (5) the next 8 entries store the possible values for Tdi; (6) the next 8 entries store the possible values for Tfi; (7) the next 8 entries store the possible values for Tw; and (8) the next 8 entries store the possible values for Th. The entries in the lookup table are accessed using addresses derived based upon the dimensions of the marks and spaces. For example, an entry in the Tdpost section may be accessed using an address derived by concatenating the dimensions of the present mark, the post space, and the post mark, such that the dimension of the present mark is used as the three least significant bits, the dimension of the post space is used as the next three significant bits, and the dimension of the post mark is used as the three most significant bits of the address. FIG. 4 indicates the concatenation operation with a "–". Thus, if the dimension of the present mark is 000, the dimension of the post space is 111, and the dimension of the post mark is 010, then the address would be: 010111000. The Tdpost value for such a combination of present mark, post space, and post mark dimensions would be stored at that address.

Entries in the other sections of the lookup table may be accessed in a similar fashion. Specifically, an entry in the Tfpre section may be accessed using an address derived from the concatenation of the dimensions of the present mark, the pre space, and the pre mark, plus an offset of h200 (i.e. 200 hex). An entry in the Tdpre section may be accessed using an address derived from the concatenation of the dimensions of the pre space and pre mark, plus an offset of h400. An entry in the Tfpost section may be accessed using an address derived from the concatenation of the dimensions of the post space and post mark, plus an offset of h440. Finally, the entries in the Tdi, Tfi, Tw, and Th sections may be accessed using an address derived by adding the dimension of the present mark to an appropriate offset. Using the lookup table of FIG. 4, the values needed to determine the delays and pulse widths for the control signals EFM1, EFM2, and EFM3 can be easily accessed and retrieved.

Figure 5:
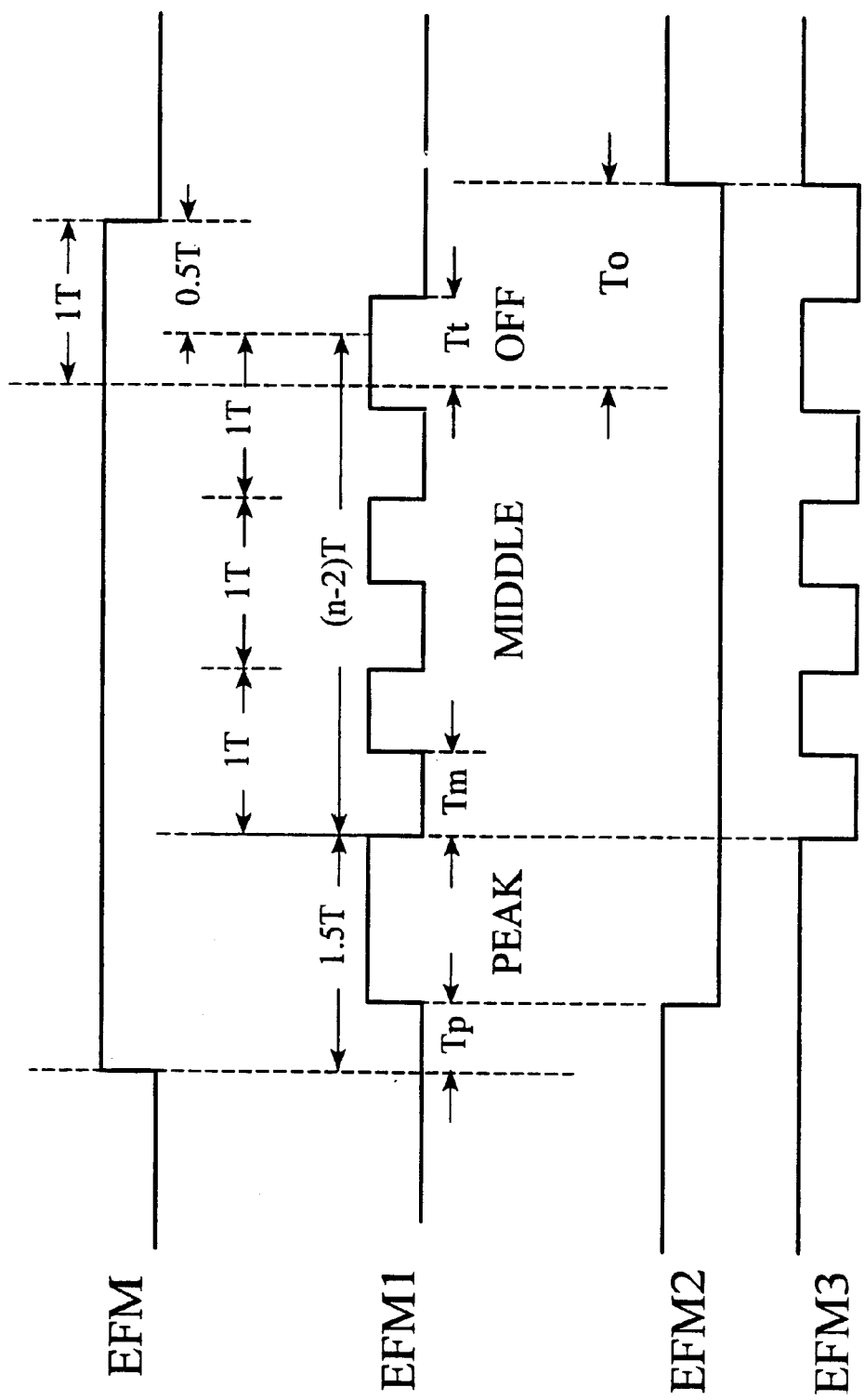
FIG. 5 shows the timing diagrams for a plurality of control signals which may be used to control a writing mechanism in accordance with the present invention. The timing diagrams of FIG. 5 apply to CD-RW technology.

With reference to FIG. 5, a second possible embodiment of the present invention will now be described. FIG. 5 shows the timing diagrams for a plurality of control signals which may be used to control a writing mechanism in a CD-RW type of system to impose a present mark 102 onto a CD. These control signals, which are generated by the apparatus of the present invention (described in a later section), include a main control signal EFM1 having a main pulse and a plurality of middle pulses, a secondary control signal EFM2, and another secondary control signal EFM3. With CD-RW, not all of these control signals need to be sent to a writing mechanism. Rather, a combination of either EFM1 and EFM2, or EFM1 and EFM 3 will suffice. FIG. 5 further shows a reference signal EFM which represents the series of marks and spaces that are to be written onto a storage medium. The reference signal EFM includes an indication of the desired dimension of the present mark 102 (i.e. the width of the EFM pulse shown is the desired dimension of the present mark in periods T), as well as indication of the dimensions of the surrounding marks and spaces. Since the present mark 102 may range from 3T to 11T, the width of the EFM pulse may also range from 3T to 11T. For the sake of illustration, the reference signal EFM is shown in FIG. 5 as being 5T long; however, it should be noted that the reference signal EFM may have other dimensions. Once the dimensions of the present mark 102 and the surrounding marks and spaces are known, certain delays and pulse widths are determined.

Specifically, there is a parameter Tm which determines the pulse widths of the pulses in the middle of the main control signal EFM1. In one embodiment, this parameter Tm depends upon the dimension of the present mark 102 (i.e. the pulse width of the reference signal EFM). Since the present mark 102 may have one of eight possible dimensions (treating 8T and 9T as being the same), the parameter Tm may have one of eight possible values. The different values for the parameter Tm depend upon various factors, many of which are implementation specific. Thus, the possible values for the parameter Tm are determined experimentally for each implementation.

There is also a falling edge delay parameter To, which begins at 1T prior to the falling edge of the reference signal EFM, and ends at the rising edge of either of the secondary control signals EFM2, EFM3. In one embodiment, To depends upon the dimension of the present mark 102. Since the present mark 102 may have one of eight possible dimensions (treating 8T and 9T as being the same), the parameter To may have one of eight possible values. The different values for the parameter To depend upon various factors, many of which are implementation specific. Thus, the possible values for the parameter To are determined experimentally for each implementation.

There is also a rising edge delay Tp which determines the timing of the rising edge of the main control signal EMF1. This delay starts from the rising edge of the reference signal EFM and ends at the rising edge of the main control signal EFM1. Unlike the parameter Tm, the value of this delay Tp depends not only upon the dimension of the present mark 102 but also upon the effects due to the marks 106, 110 and spaces 104, 108 within relatively close proximity to the present mark 102. According to one embodiment, the delay Tp is determined based upon the following expression:

$$Tp=Tpi+Tppre \text{ (Prem, Pres)}+Tppost \text{ (Mark, Postm, Posts)};$$

where
Tpi=an intrinsic (minimum) delay value which depends upon the dimension of the present mark 102;
Tppre=the contribution to the delay value due to the pre mark 106 and the pre space 104; and
Tppost=the contribution to the delay value due to the present mark 102, the post mark 110, and the post space 108;

This expression specifies that the rising edge delay Tp comprises three components: (1) an intrinsic component Tpi which depends upon the dimension of the present mark 102; (2) a variable component Tppre which depends upon the dimensions of the pre mark 106 and the pre space 104; and (3) a variable component Tppost which depends upon the dimensions of the present mark 102, the post mark 110, and the post space 108. Tppre may be viewed as the contribution to the delay Tp from the pre mark 106 and pre space 104, while Tppost may be viewed as the contribution to the delay Tp from the post mark 110, the post space, and the present mark 102 itself. Since each mark and space has eight possible dimension values (000 to 111), and since Tppre depends upon the combination of Pres and Prem, there are sixty four (8×8) possible values for Tppre. Likewise, since Tppost depends upon the combination of Mark, Postm, and Posts, there are five hundred and twelve (8×8×8) possible values for Tppost. Various factors, many of which are implementation specific, affect the values for Tpi, Tppre and Tppost. Thus, the values for Tpi, Tppre and Tppost are determined experimentally for each implementation.

There is also a falling edge delay Tt which determines the falling edge of the main control signal EFM1. Like delay Tp, this delay Tt depends not only upon the dimension of the present mark 102 but also upon the effects due to the marks 106, 110 and spaces 104, 108 within relatively close proximity to the present mark 102. Delay Tt begins at lT prior to the falling edge of the reference signal EFM, and continues until some time prior to the falling edge of the reference signal EFM. According to one embodiment, the delay Tt is determined based upon the following expression:

$$Tt=Tti+Ttpost \text{ (Postm, Posts)}+Ttpre \text{ (Mark, Prem, Pres)};$$

where
Tti=an intrinsic (minimum) delay value which depends upon the dimension of the present mark 102;
Ttpost=the contribution to the delay value due to the post mark 110, and the post space 108; and
Ttpre=the contribution to the delay value due to the present mark 102, the pre mark 106 and the pre space 104.

This expression specifies that the falling edge delay Tt comprises three components: (1) an intrinsic component Tti which depends upon the dimension of the present mark 102; (2) a variable component Ttpost which depends upon the dimensions of the post mark 110 and the post space 108; and (3) a variable component Ttpre which depends upon the dimensions of the present mark 102, the pre mark 106, and the pre space 104. Ttpost may be viewed as the contribution to the delay Tt from the post mark 110 and post space 108, while Ttpre may be viewed as the contribution to the delay Tt from the pre mark 106, the pre space 104, and the present mark 102 itself. Since each mark and space has eight possible dimension values (000 to 111), and since Ttpost depends upon the combination of Posts and Postm, there are sixty four (8×8) possible values for Ttpost. Likewise, since Ttpre depends upon the combination of Mark, Prem, and Pres, there are five hundred and twelve (8×8×8) possible values for Ttpre. Various factors, many of which are implementation specific, affect the values for Tti, Ttpost, and Ttpre. Thus, the values for Tti, Ttpost, and Ttpre are determined experimentally for each implementation.

As an alternative to having delay Tt depend upon the marks 102, 106, 110, and spaces 104, 108, and having delay To depend upon the present mark 102, it is possible to have the reverse, wherein the delay To depends upon the marks 102, 106, 110, and spaces 104, 108, and wherein the delay Tt depends upon the present mark 102. According to this alternative, the delay To is determined based upon the following expression:

$$To=Toi+Topost\ (Postm, Posts)+Topre\ (Mark, Prem, Pres);$$

where

Toi=an intrinsic (minimum) delay value which depends upon the dimension of the present mark 102;

Topost=the contribution to the delay value due to the post mark 110, and the post space 108; and Topre=the contribution to the delay value due to the present mark 102, the pre mark 106 and the pre space 104.

This expression specifies that the delay To comprises three components: (1) an intrinsic component Toi which depends upon the dimension of the present mark 102; (2) a variable component Topost which depends upon the dimensions of the post mark 110 and the post space 108; and (3) a variable component Topre which depends upon the dimensions of the present mark 102, the pre mark 106, and the pre space 104. Topost may be viewed as the contribution to the delay To from the post mark 110 and post space 108, while Topre may be viewed as the contribution to the delay To from the pre mark 106, the pre space 104, and the present mark 102 itself. Since each mark and space has eight possible dimension values (000 to 111), and since Topost depends upon the combination of Posts and Postm, there are sixty four (8×8) possible values for Topost. Likewise, since Topre depends upon the combination of Mark, Prem, and Pres, there are five hundred and twelve (8×8×8) possible values for Topre. Various factors, many of which are implementation specific, affect the values for Toi, Topost, and Topre. Thus, the values for Toi, Topost, and Topre are determined experimentally for each implementation.

Figure 6:
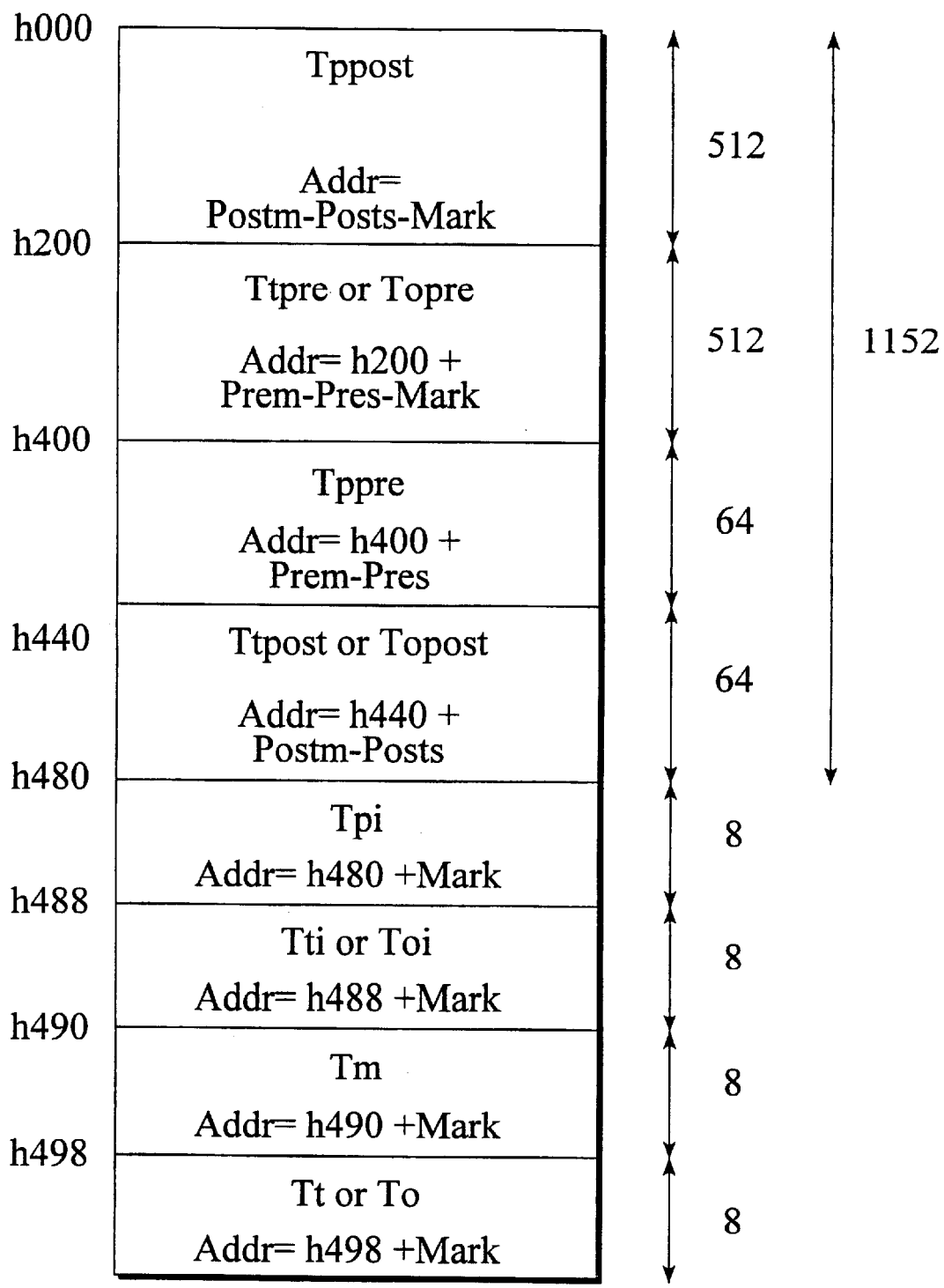
FIG. 6 shows a sample lookup table which may be used to store all of the values needed to determine the timing parameters of the control signals of FIG. 5.

To facilitate implementation of the invention, all of the values that are needed to compute the various delays and pulse widths for the control signals EFM1, EFM2, and EFM3 of FIG. 5 may be stored in a lookup table, such as that shown in FIG. 6. In the sample lookup table of FIG. 6: (1) the first 512 entries store the possible values for Tppost; (2) the next 512 entries store the possible values for Ttpre or Topre; (3) the next 64 entries store the possible values for Tppre; (4) the next 64 entries store the possible values for Ttpost or Topost; (5) the next 8 entries store the possible values for Tpi; (6) the next 8 entries store the possible values for Tti or Toi; and (7) the next 8 entries store the possible values for Tm; and (8) the next 8 entries store the possible values for Tt or To. As was the case with the lookup table of FIG. 4, the entries in the lookup table of FIG. 6 are accessed using addresses derived based upon the dimensions of the marks and spaces. For example, an entry in the Tppost section may be accessed using an address derived by concatenating the dimensions of the present mark, the post space, and the post mark. This concatenation is performed in the same manner as that described in connection with FIG. 4. Thus, if the dimension of the present mark is 000, the dimension of the post space is 111, and the dimension of the postmark is 010, then the address would be: 010111000. The Tppost value for such a combination of present mark, post space, and post mark dimensions would be stored at that address.

Entries in the other sections of the lookup table may be accessed in a similar fashion. Specifically, an entry in the Ttpre or Topre section may be accessed using an address derived from the concatenation of the dimensions of the present mark, the pre space, and the pre mark, plus an offset of h200 (i.e. 200 hex). An entry in the Tppre section may be accessed using an address derived from the concatenation of the dimensions of the pre space and pre mark, plus an offset of h400. An entry in the Ttpost or Topost section may be accessed using an address derived from the concatenation of the dimensions of the post space and post mark, plus an offset of h440. Finally, entries in the Tpi, Tti or Toi, Tm, and Tt or To sections may be accessed using an address derived by adding the dimension of the present mark to an appropriate offset. Using such a lookup table, the delay and pulse width values needed to generate the control signals EFM1, EFM2, and EFM3 can be easily accessed and retrieved.

Figure 7:
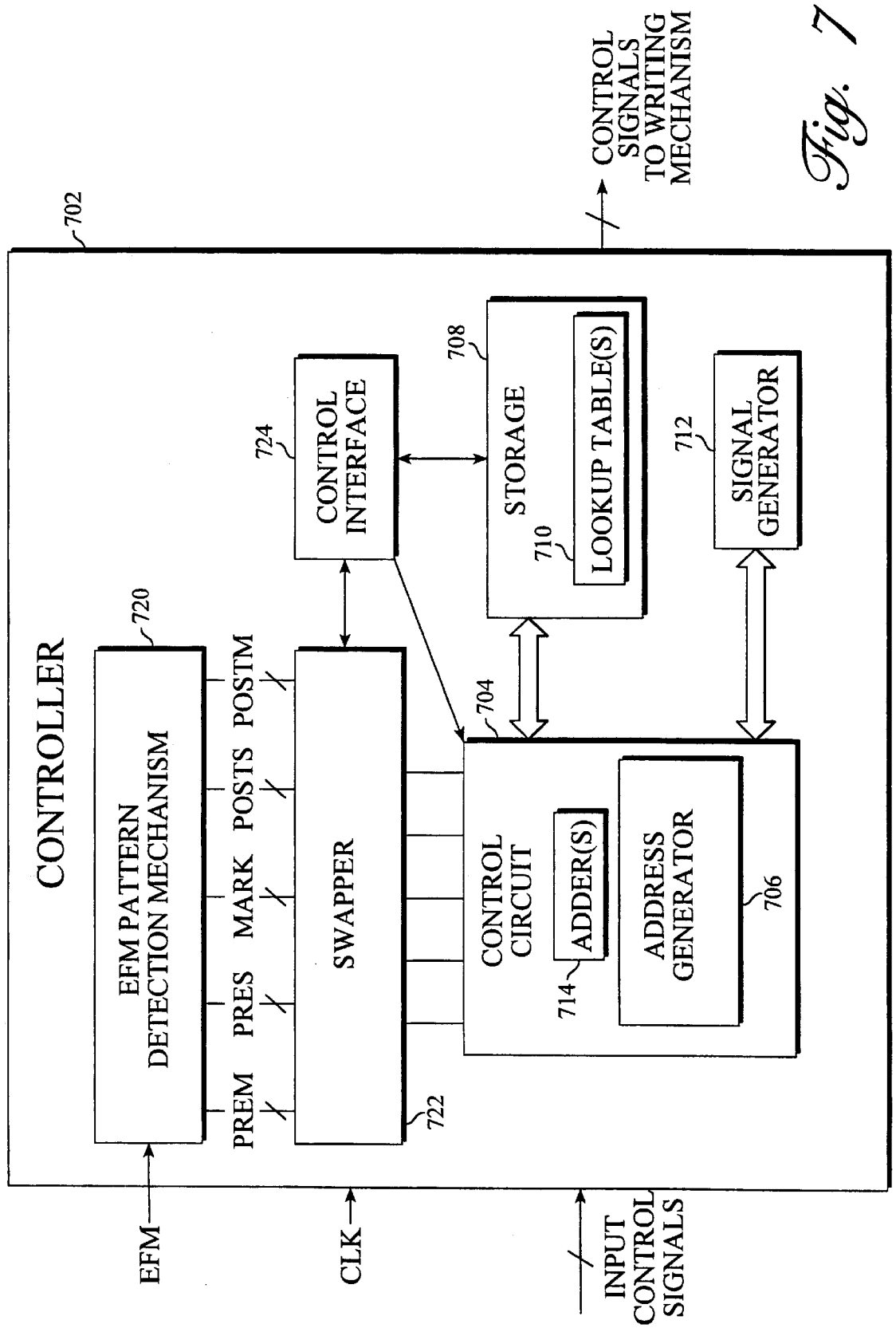
FIG. 7 is a block diagram of a controller which may be used to implement the methodology of the present invention.

With reference to FIG. 7, there is shown a functional block diagram of a controller 702 which may be used to implement the methodology of the present invention. In one embodiment, the controller 702 comprises a control circuit 704, a storage 708 for storing one or more lookup tables 710 (such as those shown in FIGS. 4 and 6), a signal generator 712, an EFM pattern detection mechanism 720, a swapper 722, and a control interface 724. The controller 702 receives as input an EFM reference signal, a clock signal CLK, and one or more implementation specific input control signals, and provides as output a set of control signals for controlling a writing mechanism. In one embodiment, the detection mechanism 720 receives the EFM reference signal (which specifies the marks and spaces to be written onto a storage medium) and provides a set of dimension indication signals Prem, Pres, Mark, Posts, Postm indicating the dimensions of the pre mark 106, the pre space 104, the present mark 102, the post space 108, and the post mark 110, respectively. These indication signals Prem, Pres, Mark, Posts, Postm are passed on to the swapper 722. Depending upon the control settings for the swapper 722, the swapper 722 may swap the value of one signal for another. As an example, the swapper 722 may swap Prem for Postm so that the value for Prem is used as the value for Postm. Likewise, the swapper 722 may swap Pres for Posts so that the value for Pres is used as the value for Posts. One of the utilities of the swapper 722 is to make it possible to easily change an expression. For example, it was previously shown that, according to one embodiment, the delay Td may be determined using the expression:

$$Td=Tdi+Tdpre\ (Prem, Pres)+Tdpost\ (Mark, Postm, Posts);$$

where Tdpre depends on Prem and Pres, and Tdpost depends on Mark, Postm, and Post. By swapping Prem for Postm and Pres for Posts, the above expression can be changed to:

$$Td=Tdi+Tdpre\ (Postm, Posts)+Tdpost\ (Mark, Prem, Pres);$$

where Tdpre depends on Postm and Posts, and Tdpost depends on Mark, Prem, and Pres. As this illustrates, the ability to swap enables the expression to be easily changed, which in turn imparts great flexibility to the present invention.

The output of the swapper 722 is coupled to the input of the control circuit 704. The control circuit 704, which in one embodiment is implemented in hardware using logic circuit components, comprises an address generator 706 and an adder 714. The address generator 706 is invoked to generate proper addresses for accessing the lookup table 710, while the adder 714 is invoked, when necessary, to calculate the timing parameters for the control signals. Once the proper timing parameters are calculated, they are sent by the control circuit 704 to the signal generator 712. In response, the signal generator 712 generates, based upon the timing parameters, all of the control signals necessary for controlling the writing mechanism. Once that is done, the control signals are sent to the writing mechanism to cause the writing mechanism to properly impose the present mark onto a CD.

To facilitate initialization and control of the controller 702, there is provided the control interface 724. The control interface 724 enables other components (not shown) to access selected components of the controller 702 to control the controller's operation. In one embodiment, the control interface 724 may be used to write values into the lookup table(s) 710, and to set certain options, such as the swapping function of the swapper 722 and various options in the control circuit 704.

Figure 8:
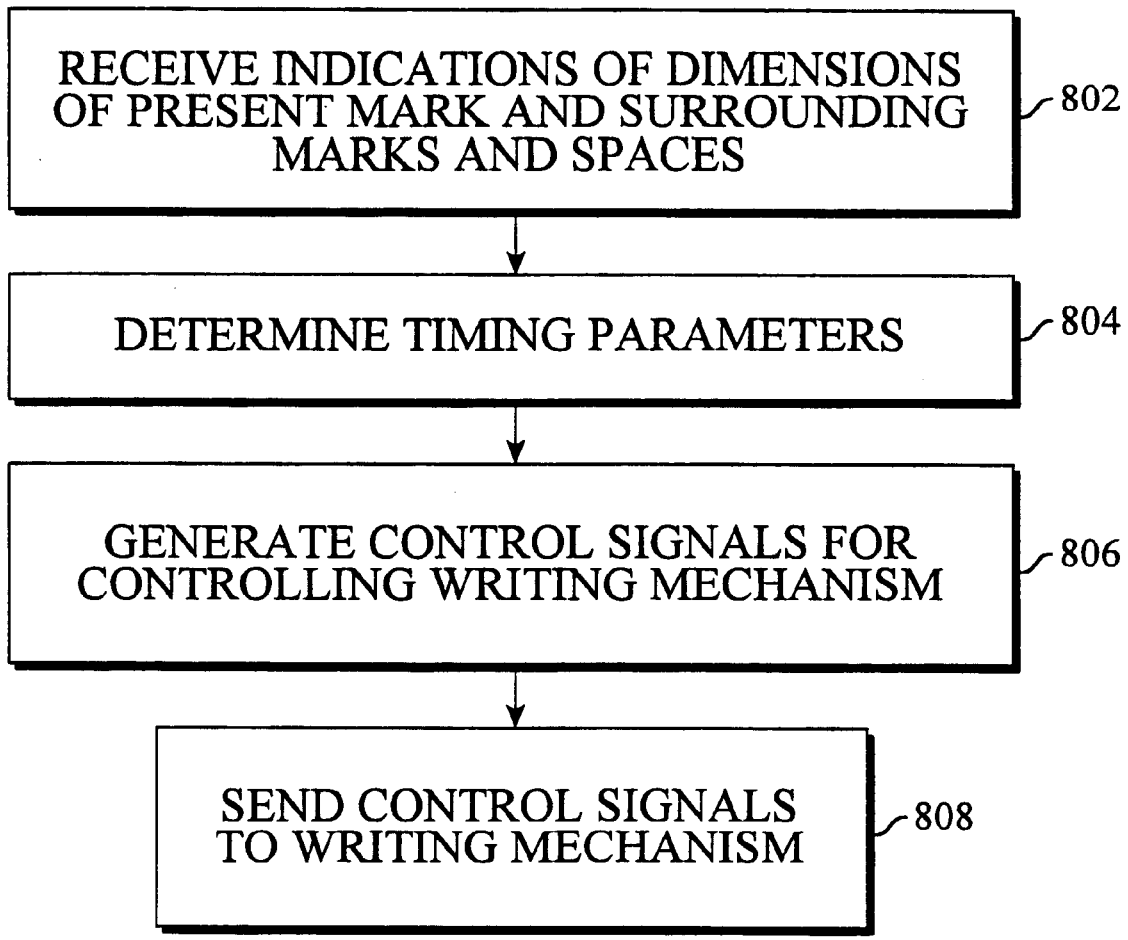
FIG. 8 is a flow diagram illustrating the flow of operation of the present invention.

With reference to the flow diagram of FIG. 8, the operation of the controller 702 will now be described in greater detail. Controller 702 begins operation by having the detection mechanism 720 receive the EFM reference signal, and generate the dimension indication signals Prem, Pres, Mark, Posts, Postm for the pre mark 106, the pre space 104, the present mark 102, the post space 108, and the post mark 110, respectively. In one embodiment, each of the dimension indication signals Prem, Pres, Mark, Posts, Postm comprises three bits of information indicating the dimension (between 3T and 11T) of the corresponding mark or space. Once these dimension indication signals Prem, Pres, Mark, Posts, Postm are generated, they are passed on to the swapper 722, which, depending upon its control settings, may or may not swap the signal values. The output of the swapper 722 is passed on to the control circuit 704. Once it receives (802) the signals Prem, Pres, Mark, Posts, Postm, the control circuit 704 proceeds to determine (804) the timing parameters for the various control signals. For a CD-R system, these parameters include Th, Tw, Td, and Tf for the control signals EFM1, EFM2, and EFM3 (FIG. 3). For a CD-RW system, these parameters include Tm, Tp, Tt, and To for the control signals EFM1, EFM2, and EFM3 (FIG. 5). According to one embodiment, these parameters are calculated according to the expressions disclosed previously in connection with FIGS. 3 and 5.

To calculate a particular parameter, the control circuit 704 first invokes the address generator 706 to generate a proper address for accessing the lookup table 710. The address generator 706 generates the proper address by concatenating various of the dimension indication signals Prem, Pres, Mark, Posts, Postm, and by using offsets, as previously described in connection with the sample tables of FIGS. 4 and 6. Once a proper address is generated, the control circuit 704 accesses the lookup table 710 to retrieve a proper value therefrom. Once the proper value is retrieved, the control circuit 704 determines whether other values are needed to calculate the particular parameter. If no other values are needed, then the value of the parameter is the retrieved value (this is the case, for example, for the parameter Th). On the other hand, if other values are needed to calculate the parameter (as is the case for the parameter Td), then the control circuit 704 invokes the one or more adders 714 to add the retrieved value to its/their current total (which should be zero at this point). The control circuit 704 then invokes the address generator 706 again to generate another address. This process of invoking the address generator 706, accessing the lookup table 710 based upon the address generated by the address generator 706, and invoking the adder(s) 714 continues until the particular parameter has been fully calculated. Once a parameter is fully calculated, it is sent on to the signal generator 712. In addition, the adder(s) 714 is/are reset in preparation for the next calculation. This process continues until all parameters have been calculated. Note that for the parameters Td and Tf for CD-R systems, and the parameters Tp and Tt or To for CD-RW systems, the estimated effects due to the pre mark 106, the pre space 104, the post space 108, and the post mark 110 are taken into account in calculating the parameters. Thus, the timing parameters of the present invention are more precise and accurate than that of the prior art.

Once all of the timing parameters have been passed to the signal generator 712, the signal generator 712 generates (806), based upon the timing parameters, the control signals needed to control the writing mechanism. For CD-R systems, these control signals include EFM1, EFM2, and EFM3 shown in FIG. 3. For CD-RW systems, the control signals include either EFM1 and EFM2, or EFM1 and EFM3 shown in FIG. 5. Once generated, the control signals are sent (808) to the writing mechanism to cause the writing mechanism to impose the present mark 102 onto the storage medium (e.g. a CD). Because the control signals take into account the effects on the present mark due to the marks and spaces within relatively close proximity to the present mark, the control signals will cause the writing mechanism to impose the present mark such that it has substantially the desired dimension. As a result, the writing errors experienced by the prior art are eliminated.

At this point, it should be noted that although the invention has been described with reference to specific embodiments, it should not be construed to be so limited. Various modifications may be made by those of ordinary skill in the art with the benefit of this disclosure without departing from the spirit of the invention. For example, while the invention has been described with reference to CD-R and CDRW, it should be noted that the invention may also be applied to other standards and other media, such as DVD recordable and DVD rewritable media (e.g. DVD/RAM, DVD/RW). This and other applications are within the scope of the present invention.

Also, the expression for the parameter Td has been specified as being:

$$Td=Tdi+Tdpre\ (Prem,\ Pres)+Tdpost\ (Mark,\ Postm,\ Posts).$$

If so desired, this expression may be modified to:

$$Td=Tdi+Tdpre\ (Postm,\ Posts)+Tdpost\ (Mark,\ Prem,\ Pres)$$

where Tdpre depends on the dimensions of the post space 108 and the post mark 110, and Tdpost depends on the dimensions of the present mark 102, the pre space 104, and the pre mark 106.

As yet another alternative, the expression may be changed to:

$$Td=Tdi\ (Prem,\ Pres,\ Mark,\ Postm,\ Posts)+Tdpre\ (Prem,\ Pres,\ Mark,\ Postm,\ Posts)+Tdpost\ (Prem,\ Pres,\ Mark,\ Postm,\ Posts)$$

where TdpostTdi, Tdpre, and Tdpost all depend on the dimensions of the pre space 104, the pre mark 106, the present mark 102, the post space 108, and the post mark 110.

These and other modifications may be made to the expression for Td without departing from the spirit of the invention. Similar modifications may also be made to the expressions for Tf, Tp, Tt, and To without departing from the spirit of the invention. Thus, the invention should not be limited by the specific embodiments used to illustrate it but only by the scope of the appended claims.

What is claimed is:

1. A method for controlling the writing of information onto a storage medium, comprising the acts of:

receiving a set of information pertaining to a present mark to be imposed on a storage medium and one or more marks and spaces within relatively close proximity to said present mark, said set of information comprising an indication of a desired dimension for said present mark;

determining one or more parameters, said parameters taking into account one or more estimated effects on said present mark due to said one or more marks and spaces;

generating, based upon said set of information and said parameters, one or more control signals for controlling a writing mechanism, said control signals causing the writing mechanism to impose said present mark onto the storage medium such that said present mark conforms substantially with said desired dimension; and sending said one or more control signals to the writing mechanism.

2. The method of claim 1, wherein said one or more estimated effects is determined based upon one or more marks and spaces preceding said present mark.

3. The method of claim 2, wherein said one or more estimated effects is determined based upon dimensions of said one or more marks and spaces preceding said present mark.

4. The method of claim 1, wherein said one or more estimated effects is determined based upon one or more marks and spaces following said present mark.

5. The method of claim 4, wherein said one or more estimated effects is determined based upon said dimensions of said one or more marks following said present mark.

6. The method of claim 1, wherein said one or more estimated effects is determined based upon one or more marks and spaces preceding, and one or more marks and spaces following said present mark.

7. The method of claim 6, wherein said one or more estimated effects is determined based upon dimensions of said one or more marks and spaces preceding said present mark, and the dimensions of said one or more marks and spaces following said present mark.

8. The method of claim 1, wherein said one or more control signals comprises a first control signal having a rising edge, and wherein said estimated effect affects a time delay between a rising edge of a reference signal and the rising edge of said first control signal.

9. The method of claim 1, wherein said one or more control signals comprises a first control signal having a falling edge, and wherein said estimated effect affects a delay between the falling edge of said first control signal and a falling edge of a reference signal.

10. An apparatus for controlling the writing of information onto a storage medium, comprising:

a control circuit having inputs and outputs, said control circuit inputs receiving a set of information pertaining to a present mark and one or more marks and spaces within relatively close proximity to said present mark, said set of information comprising an indication of a desired dimension for said present mark, said control circuit determining one or more parameters, taking into account one or more estimated effects on said present mark due to said one or more spaces, and providing said one or more parameters at said control circuit outputs; and a signal generator having inputs and outputs, said signal generator inputs coupled to said control circuit outputs, said signal generator generating one or more control signals, based upon said one or more parameters, for controlling a writing mechanism, said control signals causing the writing mechanism to impose said present mark onto the storage medium such that said present mark conforms substantially with said desired dimension.

11. The apparatus of claim 10, further comprising a storage having a lookup table stored thereon, said lookup table comprising one or more values for said one or more estimated effects.

12. The apparatus of claim 11, wherein said control circuit comprises:

an address generator having inputs and outputs, said address generator inputs receiving at least a portion of said set of information, said address generator generating one or more addresses based upon said portion of said set of information for accessing said lookup table, and providing said one or more addresses at said address generator outputs.

13. The apparatus of claim 12, wherein said control circuit further comprises:

an adder having inputs and outputs, said adder inputs receiving one or more said values from said lookup table, said adder determining said one or more parameters based upon said one or more values from said lookup table, and providing said one or more parameters at said adder outputs.

14. The apparatus of claim 10, wherein said one or more control signals comprises a first control signal having a rising edge, and wherein said one or more estimated effects affects a time delay between a rising edge of a reference signal and the rising edge of said first control signal.

15. The apparatus of claim 10, wherein said one or more control signals comprises a first control signal having a falling edge, and wherein said one or more estimated effects affects a delay between the falling edge of said first control signal and a falling edge of a reference signal.

* * * * *